(12) United States Patent
Li et al.

(10) Patent No.: US 7,593,415 B2
(45) Date of Patent: Sep. 22, 2009

(54) VOICE PACKET SWITCHING SYSTEMS AND METHODS

(75) Inventors: San-qi Li, Plano, TX (US); Stephen R. Barnes, Allen, TX (US); Jingdong Ye, Austin, TX (US)

(73) Assignee: Santera Systems, LLC, Plano, TX (US)

( * ) Notice: Subject to any disclaimer, the term of this patent is extended or adjusted under 35 U.S.C. 154(b) by 351 days.

(21) Appl. No.: 11/297,941

(22) Filed: Dec. 9, 2005

(65) Prior Publication Data

US 2006/0092927 A1 May 4, 2006

Related U.S. Application Data

(63) Continuation of application No. 09/792,265, filed on Feb. 23, 2001, now Pat. No. 7,006,489.

(51) Int. Cl.
*H04L 12/56* (2006.01)

(52) U.S. Cl. .................. 370/401; 370/353; 370/466

(58) Field of Classification Search ......... 370/352–356, 370/387, 389, 395.1, 398, 395.52, 395.6, 370/401, 465, 467, 469

See application file for complete search history.

(56) References Cited

U.S. PATENT DOCUMENTS

| | | | |
|---|---|---|---|
| 5,375,121 A | 12/1994 | Nishino et al. | |
| 5,905,873 A | 5/1999 | Hartmann et al. | |
| 5,999,529 A | 12/1999 | Bernstein et al. | |
| 6,026,086 A * | 2/2000 | Lancelot et al. | 370/353 |
| 6,046,999 A | 4/2000 | Miki et al. | |
| 6,147,988 A | 11/2000 | Bartholomew et al. | |
| 6,339,594 B1 | 1/2002 | Civanlar et al. | |
| 6,614,781 B1 * | 9/2003 | Elliott et al. | 370/352 |
| 6,731,627 B1 | 5/2004 | Gupta et al. | |
| 6,765,931 B1 * | 7/2004 | Rabenko et al. | 370/493 |
| 6,850,778 B1 * | 2/2005 | Honkala et al. | 455/560 |
| 6,865,220 B2 * | 3/2005 | Abrishami | 375/220 |
| 7,006,489 B2 | 2/2006 | Li et al. | |
| 2001/0036158 A1 | 11/2001 | Hallenstal et al. | |

(Continued)

FOREIGN PATENT DOCUMENTS

CN  1504039 A  6/2004

(Continued)

OTHER PUBLICATIONS

Laurence et al., "Voice Over ATM: A Hybrid TDM/ATM Design Approach," Electronic Engineering, Morgan-Grampian Ltd., vol. 71, No. 869, Jun. 1999, pp. 81-82, 84, 86.

(Continued)

*Primary Examiner*—Donald L Mills
(74) *Attorney, Agent, or Firm*—Jenkins, Wilson, Taylor & Hunt, P.A.

(57) ABSTRACT

A switching system includes at least one packet processing circuit interfacing with at least one packet transmission link. The switching system further includes a switch fabric coupled to the at least one packet processing circuit, whereby the switch fabric is operable to switch between channels receiving and transmitting data over the at least one packet transmission link and channels receiving and transmitting data over at least one non-packet transmission link interfaced by the switch fabric.

20 Claims, 3 Drawing Sheets

U.S. PATENT DOCUMENTS

2002/0001302 A1* 1/2002 Pickett ....................... 370/352
2006/0062225 A1 3/2006 Li

FOREIGN PATENT DOCUMENTS

| DE | 198 29 822 A1 | 1/2000 |
| EP | 1017217 A2 * | 7/2000 |
| WO | WO 99/29136 | 6/1999 |
| WO | WO 02/069588 A2 | 9/2002 |
| WO | WO 02/069588 A3 | 9/2002 |

OTHER PUBLICATIONS

Singer et al., "Narrowband Services Over ATM Networks: Evaluation of Trunking Methods," World Telecommunications Congress, vol. 2, Sep. 21, 1997, pp. 17-25.

EP Office Action 02709657.7, Dated Jan. 23, 2006.

International Search Report, PCT/US02/05410, dated Dec. 27, 2002.

Written Opinion, PCT/US02/05410, dated Jun. 13, 2003.

International Preliminary Examination Report, PCT/US02/05410, dated Dec. 5, 2003.

Official Action for Chinese Patent Application No. 02808634.1 (Jun. 20, 2008).

Communication under Rule 71(3) EPC for European Patent Application No. 02 709 657.7 (Jan. 9, 2009).

Notice of Grant of Patent Right for Invention for Chinese Patent Application No. 02808634.1 (Dec. 26, 2008).

* cited by examiner

VOICE PACKET SWITCHING SYSTEMS AND METHODS

This application is a continuation of U.S. patent application Ser. No. 09/792,265, entitled "Voice Packet Switching System and Method," filed Feb. 23, 2001, the entire disclosure of which is hereby incorporated herein by reference.

This application is also related to commonly-assigned U.S. patent application Ser. No. 11/121,626, entitled "Apparatus and Methods for Per-Session Switching for Multiple Wireline and Wireless Data Types," filed May 4, 2005.

TECHNICAL FIELD OF THE INVENTION

This invention relates to telecommunication equipment, and more particularly, to voice packet switching systems and methods.

BACKGROUND OF THE INVENTION

The current trend in telecommunications network evolution focuses on supplanting the traditional public switched telephone network (PSTN) with emerging packet-switched based data networks. There are a number of contributing factors to this trend. Data traffic volume has far exceeded voice traffic volume and the gap continues to grow unabated. Studies have shown that voice will constitute only a very small percentage of the total telecommunication traffic. Furthermore, a data network is inherently more flexible for supporting a variety of voice and data services and has the technical potential to support all the services that are carried over PSTN today.

It will take years before all technical issues are resolved so that data networks can have the superior quality and reliability of PSTN. Meanwhile, PSTN and the rapidly developing data networks will continue to coexist. To facilitate the migration of voice telephony from PSTN toward packet networks, and to make two networks interoperate for voice services, network operators are deploying voice media gateways. Voice media gateways convert voice signals between time division multiplex (TDM) pulse code modulation (PCM) and a data packet format, either asynchronous transfer mode (ATM) or voice over Internet protocol (VoIP). Therefore, voice media gateways are currently used to bridge the data network and the PSTN, but does not perform the necessary switching functions. This type of transition network, though necessary, is not economical since it introduces duplicative network elements and increases the cost of operating and maintaining the network.

SUMMARY OF THE INVENTION

In accordance with the present invention, a voice packet switch provides end-to-end voice switching regardless of the encoding, multiplexing, or transmission protocols used by the calling and called parties, and the inter-switch trunks along the voice connection's path. The voice packet switch is further operable with all voice encoding and compression schemes, physical layer transmission protocols, access protocols, and trunking protocols. An important aspect of the present invention is the decoupling of the three key functions in switching voice over packet-switched networks: packet processing, digital signal processing, and switching. The voice packet switch of the present invention allows each key function to be implemented in the most cost efficient manner for high density applications, such as in the central office. Furthermore, each function may be implemented with the most advanced state of the art technology independently from one another. Another benefit from eliminating echo canceling and voice compression/decompression functionality from the voice packet switch is improved voice fidelity and echo cancellation quality. Further, significant end-to-end delays in voice transmission associated with jitter buffering are also eliminated. The key is the elimination of the voice compression/decompression cycles on the intermediate switches along the path of a voice connection.

In one embodiment of the present invention, a switching system includes at least one packet processing circuit interfacing with at least one packet transmission link. The switching system further includes a switch fabric coupled to the at least one packet processing circuit, whereby the switch fabric is operable to switch between channels receiving and transmitting data over the at least one packet transmission link and channels receiving and transmitting data over at least one non-packet transmission link interfaced by the switch fabric.

In yet another embodiment of the present invention, a switching system includes at least one packet processing circuit interfacing with first data traffic in a first protocol received and transmitted using a first transmission protocol. The switching system further includes a switch fabric coupled to the at least one packet processing circuit, whereby the switch fabric is operable to switch between channels coupled to the first data traffic and channels coupled to a second data traffic in a second protocol received and transmitted using a second transmission protocol interfaced by the switch fabric.

In yet another embodiment of the present invention, a voice packet switch includes a plurality of ATM packet processing circuits operable to receive and transmit data packets over a plurality of ATM transmission links and operable to extract data from the ATM data packets and insert the extracted data into data frames of a predetermined protocol. The voice packet switch further includes a time slot interchange coupled to the plurality of ATM packet processing circuits and operable to switch the data frames received therefrom and multiplexed PCM data received and transmitted over a plurality of PCM transmission links.

In yet another embodiment of the present invention, a voice packet switch includes a plurality of VoIP packet processing circuits operable to receive and transmit data packets over a plurality of IP transmission links and operable to extract data from the IP data packets and insert the extracted data into data frames of a predetermined protocol. The voice packet switch further includes a time slot interchange coupled to the plurality of VoIP packet processing circuits and operable to switch the data frames received therefrom and multiplexed PCM data received and transmitted over a plurality of PCM transmission links.

In yet another one embodiment of the present invention, a method of switching voice packets includes the steps of receiving data packets transmitted over at least one packet transmission link, processing the data packets, and converting the data packets to data frames of a predetermined data link protocol. The data frames are received at an input channel of a switch fabric, and output to an output channel of the switch fabric. The data frames are then converted to data packets, and transmitted over at least one packet transmission link.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 5 of the drawings, like numerals being used for like and corresponding parts of the various drawings.

Figure 1:
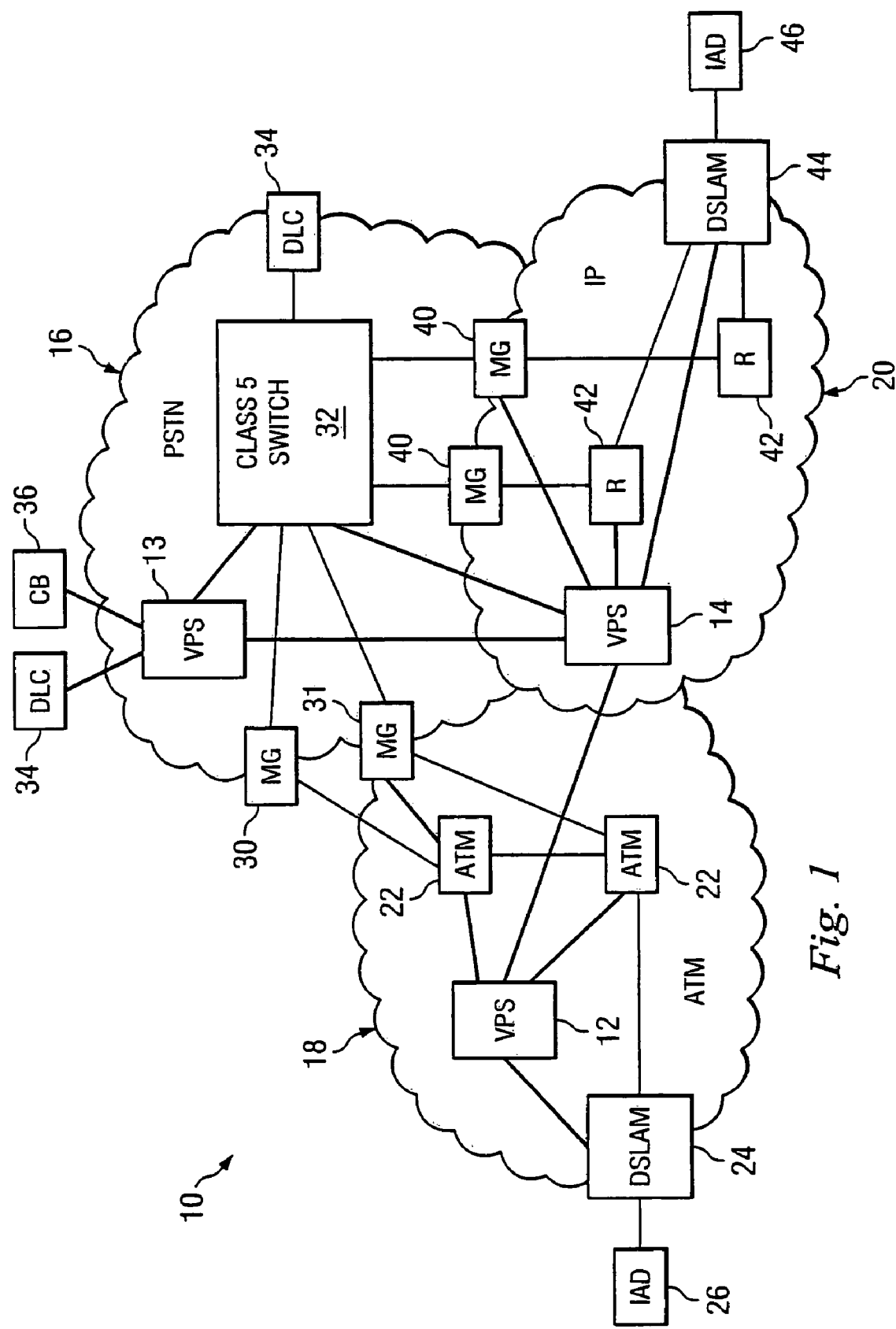
FIG. 1 is a simplified block diagram of an evolving telecommunication network employing voice packet switching systems of the present invention.

FIG. 1 is a simplified block diagram of an evolving telecommunication network 10 employing voice packet switching systems 12-14 of the present invention. Evolving network 10 is a conglomerate of current and next generation equipment operating in a public switched telephone network (PSTN) 16 for voice services, and an asynchronous transfer mode network (ATM) 18 and an Internet protocol network (IP) 20 for data services. ATM is a high bandwidth, low-delay, connection-oriented, packet-like switching and multiplexing technology used to support the transmission of data, voice data, video data, image data, multimedia data traffic. ATM network 18 employs equipment such as ATM switches 22, digital subscriber line access multiplexers (DSLAM) 24, and integrated access devices (IAD) 26. ATM network 18 further includes one or more voice packet switches 12 of the present invention for switching individual multiplexed voice streams within the ATM network. A voice stream is defined herein as unidirectional successive voice signals from one party to another in the same voice connection.

ATM network 18 is coupled to PSTN 16 via voice media gateways (MG) 30 and 31. PSTN employs equipment such as Class 5 switches 32, Class 4 switches (not shown), digital loop carriers 34, and channel banks (CB) 36 to route and deliver voice and data traffic. PSTN 16 is further coupled to EP network 20 via voice media gateways 40 to convert the voice signals between TDM PCM and IP. IP network 20 additionally employs equipment such as routers 42, DSLAMs 44, and IADs 46 in addition to a voice packet switching system 14 of the present invention. Using the voice packet switching systems of the present invention, voice traffic can be carried over any data packet protocol (VoX), such as IP and ATM protocols favored today.

It may be seen that a voice packet switch may function as an interface device between two networks of disparate formats, such as voice packet switch 14 between ATM and IP networks 18 and 20. The existence of voice media gateways in evolving network 10 is due to their integration into the telecommunications network to solve the voice-data interface problem prior to the introduction of the voice packet switching system. With the deployment of voice packet switching systems, the voice media gateways may be eventually phased out as network deployment logistics and capital equipment schedules allow.

The voice packet switching system of the present invention is operable to perform any-to-any switching so that a voice stream can be switched between any encoding and transmission schemes. The voice packet switch is operable to terminate the inbound channel, extract the voice signal carried within and put it back on the matching outbound channel, regardless of whether the same or different encoding and transmission schemes are used by the inbound and outbound channels. Furthermore, these functionalities are performed economically even at a large scale. Because there is a fundamental difference between TDM (time division multiplex) to AAL1 (ATM adaptation layer type 1) and AAL2 (ATM adaptation layer type 2) to VoIP (voice over IP) in the ways individual voice streams are multiplexed over a single connection, the voice packet switch of the present invention differentiates and operates differently on them. Each TDM channel or AAL1 connection carries only one voice stream, while each AAL2 connection may carry up to 240 simultaneous voice streams, and each VoIP connection may carry even more. The voice packet switching system of the present invention is operable to de-multiplex the voice streams and switch them individually to their corresponding outbound channels according to the path of each voice conversation, and then re-multiplex all the outbound voice streams sharing the same next hop switch onto the same outbound AAL2 or VoIP connections. In this way, voice applications can be decoupled from the specifics of the encoding and transmission schemes that are of little concern or consequence to the end users. Finally, as a central office switch for network carriers, the voice packet switch of the present invention is operable to be scaled up economically as the density of voice ports increases.

The current state of the art does not include any equipment that satisfies the above-enumerated requirements. For example, media gateways only perform voice conversions either between TDM and ATM or between TDM and VoIP, but seldom both. Further, media gateways do not perform switching functions. No IP router or ATM switch today perform the individual voice stream switching when these streams are multiplexed. All ATM switches today perform switching in ATM format only, and IP routers switch IP packets between different IP ports only. No multiplexing of voice streams is performed. Further, IADs and DLCs convert voice streams between IP or ATM and TDM only, and typically do not perform any switching functionality. It will be seen with reference to FIGS. 2-5 below that the voice packet switching system and method of the present invention provides a unique solution to converge voice and data communications into tomorrow's data-centric telecommunications network.

Figure 2:
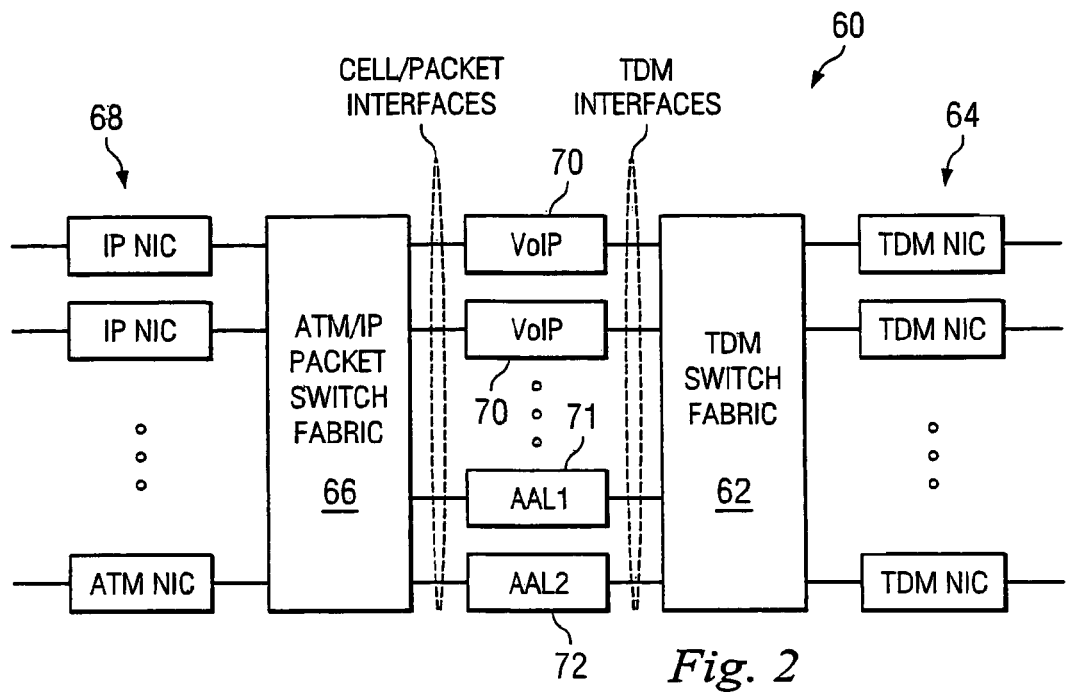
FIG. 2 is a simplified architectural block diagram of an embodiment of the voice packet switching system according to the teachings of the present invention.

FIG. 2 is a simplified base architectural block diagram of an embodiment of the voice packet switching system 60 according to the teachings of the present invention. Voice packet switching system 60 includes a TDM switch fabric 62, which is coupled to TDM transmission links via TDM network interface controllers (NICs) 64. TDM switch fabric 62 is a time slot interchange with a channel size of DS0 or 64 Kbps bandwidth. An ATM/IP switch fabric 66 is operable to switch variable length packets. Network interface controllers 68 coupled to ATM/IP switch fabric 66 is operable to terminate IP or ATM transmission links. Voice service modules such as VoIP 70, AAL1, and AAL2 are circuits or chips that are operable to perform interfacing, packet processing, and optionally voice compression and echo cancellation. AAL1 supports Class A traffic, which is connection-oriented, constant bit rate (CBR), time-dependent traffic such as uncompressed digitized voice and video data. AAL2 supports Class B traffic, which is connection-oriented, variable bit rate (VBR), isochronous traffic requiring precise timing between source and sink such as compressed voice and video traffic. Although these voice service modules are shown as separate logical blocks in FIG. 2, they may be integrated and realized on a single circuit board or in a variety of configurations. Switch 60 is operable to perform any-to-any switching between voice and data formats and speeds.

Figure 3:
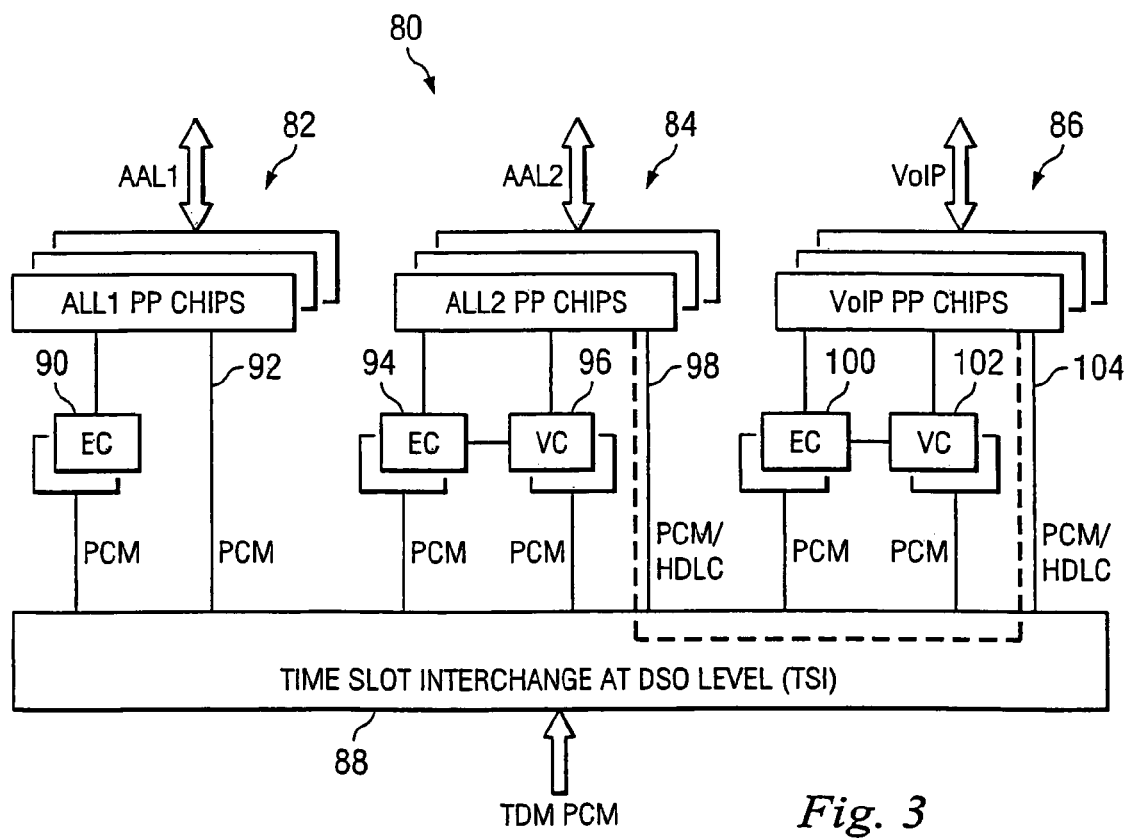
FIG. 3 is a simplified block diagram of an alternative embodiment of a voice packet switching system according to the teachings of the present invention.

FIG. 3 is a simplified block diagram of an embodiment of a voice packet switching system 80 according to the teachings of the present invention. Voice packet switching system 80 is a simple and straightforward implementation of the base architecture shown in FIG. 2. Voice packet switching system 80 includes AAL1 packet processing (PP) circuits or chips 82, AAL2 packet processing circuits or chips 84, and VoIP packet processing circuits or chips 86 interfacing and processing the AAL1, AAL2, and VoIP packets, respectively. AAL1 packet processing circuits 82 are coupled to a time slot interchange 88 or the TDM switch fabric via echo canceling circuits or chips 90 and a pulse code modulation link 92. AAL2 packet processing circuits 84 are coupled to a time slot interchange 88 via echo canceling circuits 94, voice compression circuits or chips 96, and a pulse code modulation/high-level data link control (PCM/HDLC) link 98. HDLC is a link layer protocol standard for point-to-point and point-to-multipoint communications. HDLC encapsulates packet data in a frame with the frame header and trailer including various control information such as error control mechanisms. HDLC variants include frame relay, link access procedure-balanced (LAP-B), link access procedure-data channel (LAP-DC), point-to-point protocol (PPP), and synchronous data link control (SDLC).

Using the data link layer protocol, one bit-stream HDLC channel per voice connection is used to interconnect two AAL2 and VoIP packet processing circuits through time slot interchange 88. The encoded voice frames (or mini packets) encapsulated in AAL2 cells or VoIP packets are extracted and put in the HDLC frames for switching through time slot interchange 88. After switching, these voice frames are put back to the outbound AAL2 cells or VoIP packets. Silence insertion descriptor (SID) messages for silence detection purpose can be transparently passed through AAL2 packet processing circuit 84 between a standard ATM interface and time slot interchange 88, using different user-to-user indication (UUI), as to propagate through the network. AAL2 packet processing circuit 84 does not perform the service specific convergence sublayer (SSCS) functions, so both SID messages and voice packets are treated identically. HDLC channel overhead includes two bytes for AAL2 header, two bytes for the HDLC header, and bit stuffing, while the total HDLC channel raw bandwidth is limited to 64 kbps. If PCM is used to carry a voice stream over AAL1, the PCM stream can run through in their native DS0 TDM format instead of using an HDLC channel. HDLC protocol is selected in this embodiment because it is widely implemented and many commercial off-the-shelf hardware and software are readily available. Other suitable protocols may be used if additional benefits can be conferred. After compression, a voice stream is no more than 40 Kbps. The total sum of the voice payload, the HDLC overhead, and AAL2/VoIP overhead is under 64 Kbps. This crucial observation urges the use of time slot interchange 88 as the unified switch fabric to meet all voice stream switching requirements.

In operation, switching between a pair of TDM traffic is preferably done in PCM. Switching between a pair of ATM AAL1 is preferably done in PCM. Any combination of AAL2/VoIP to AAL2/VoIP switching, both with the same adaptive differential pulse code modulation (ADPCM) encoding subtype, can be switched using direct PCM or HDLC. If direct PCM is chosen, only a fixed subset of bits within each byte of the encoded voice sample is filled, processed, and utilized for playback. This option requires the activation of jitter buffering. If HDLC is chosen, no jitter buffering is required. Jitter buffering is used to smooth out the random packet delay variations as the packets travels hop by hop through the telecommunications network. Because of the random variations of the time interval between the arrival of two successive cells or packets from the same voice conversation, each switch is required to assume the worst-case delay and provision large jitter buffers. As a result, the cumulative transmission delay is very significant for a voice connection that spans many hops, as is typical for toll calls. Further, this large delay makes satisfactory echo cancellation difficult, and seriously impairs the subjective quality, or the naturalness, of a voice conversation. Therefore, the LDLC path is preferred over PCM. Any combination of AAL2/VoIP to AAL2/VoIP with the same, non-ADPCM, compression encoding is preferably switched using HDLC. Any combination of AAL2/VoIP to AAL2/VoIP with different compression coding is preferably done by first converting the traffic to PCM before switching. For AAL1/TDM to AAL2/VoIP with voice compression, it is also preferable to first convert to PCM before switching. If voice compression is not used at all, switching is preferably done in PCM. The goal is to avoid repeated conversions to PCM at intermediate hops if possible by utilizing any one of the standardized data link protocols to encapsulate and transport compressed voice streams on the uniform PCM channels through time slot interchange 88. The preferred properties of the chosen data link protocol include acceptance of variable length voice mini packets, a total bandwidth not to exceed 64 Kbps, and error detection and recovery capabilities, such as HDLC and similar protocols.

If the option of using the standardized data link protocol to transport compressed voice streams on the uniform PCM channels is not available, conversion to PCM must be performed at each hop, requiring jitter buffering at each hop. Further, each compression and decompression cycle introduces certain amount of distortion. The accumulation of such distortion as a voice connection traverses multiple switches can be substantial for additional impairment of the voice qualities. A further disadvantage is the prohibitively high cost or limitations on heat dissipation associated with integrated packet processing, echo canceling and voice compression chips or modules. An integrated chip is also ill suited for a central office application because of high unit cost, low density, and heat dissipation concerns.

The present invention becomes even more relevant in view of the current trend toward the predominance of AAL2/VoIP for voice traffic in next generation networks. In these networks, the process of performing repetitive echo cancellation and voice compression/decompression at each network hop becomes glaringly inefficient, unnecessary and disadvantageous (due to quality degradation).

Figure 4:
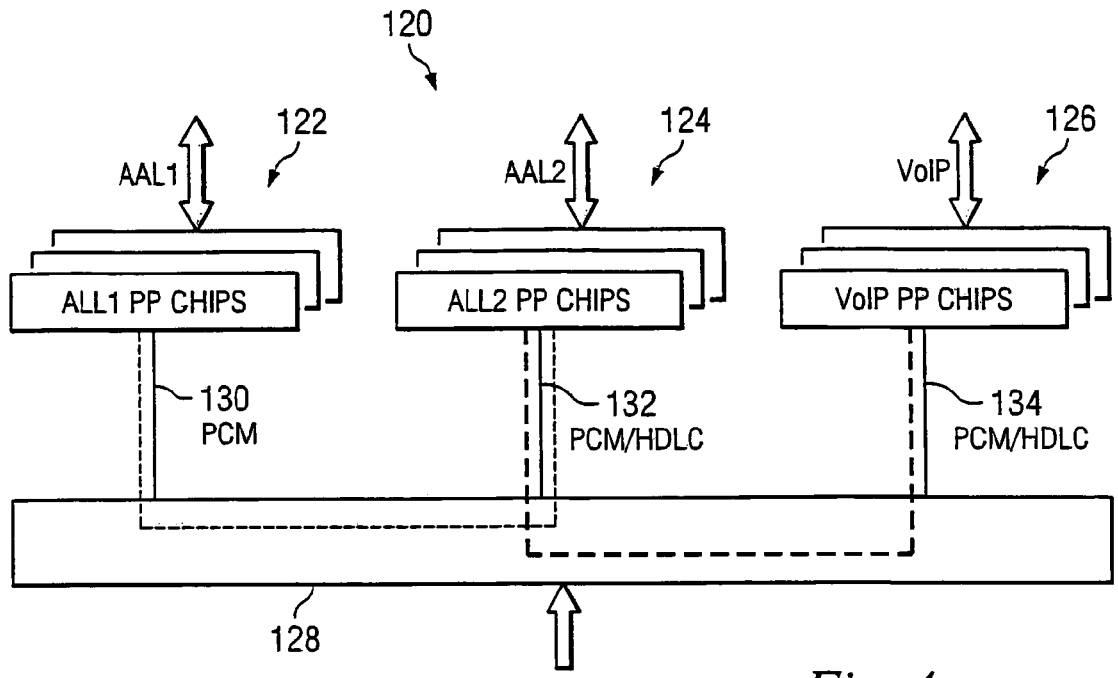
FIG. 4 is a simplified block diagram of another embodiment of a voice packet switching system according to the teachings of the present invention.

FIG. 4 is a simplified block diagram of another embodiment of a voice packet switching system 120 that has been decoupled from digital signal processing according to the teachings of the present invention. Voice packet switching system 120 includes no costly digital signal processing circuits or chips and therefore does not perform echo cancellation or voice compression. A voice connection path consists of one originating switch, one terminating switch, and intermediate switches. When voice compression is used, it only has to take place in the originating switch and the terminating switch, and is unnecessary in the intermediate switches. Further motivation to move digital signal processing out of the voice packet switch is the decreasing economic and technological incentives to compress voice because of the dramatic and continued increase in network bandwidth, the explosive growth of data traffic, and the diminishing percentage of voice in the overall traffic mix. Many mandatory digital signal processing functions as well as the optional voice compression function may be moved to the customer premises equipment (CPE), because integrated chip sets that incorporate packet processing, echo cancellation and voice compression functions are readily available. These chip sets, while ill suited for central office switches, are ideal in CPE applications where highly integrated functionality is valued but density is seldom a serious consideration.

As shown in FIG. 4, voice packet switching system 120 includes AAL1 packet processing circuits 122, AAL2 packet processing circuits 124 and VoIP packet processing circuits 126. AAL1 packet processing circuits 122 are coupled to a time slot interchange 128 via a PCM data link 130. AAL2 packet processing circuits 124 are coupled to time slot interchange 128 via a PCM/HDLC data link 132. VoIP packet processing chips 126 are coupled to time slot interchange 128 via a PCM/HDLC data link 134. Traffic is presented to and switched by time slot interchange 128 either in native PCM format for uncompressed voice streams or in a standard data link protocol such as HDLC for compressed voice streams. The TDM time slot interchange 128 is an integral component of the overall architecture of voice packet switching system 120 to facilitate the implementation of the requisite Class 5 functions such as conference call bridging, Communications Assistance for Law Enforcement Act. (CALEA), operator barge-in, tone generation, digital announcements, and in-band voice signaling terminations and dialed digits.

Figure 5:
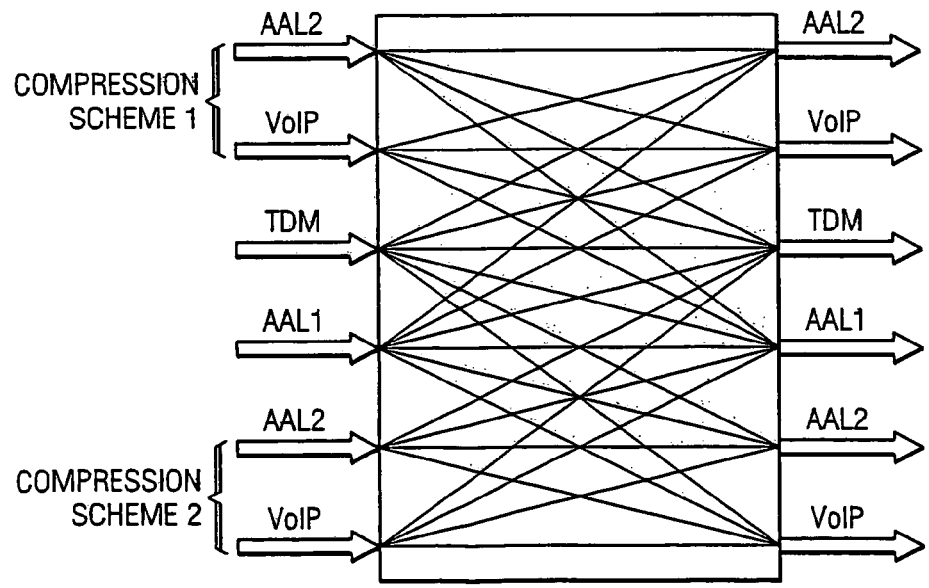
FIG. 5 is a graphical representation of the any-to-any switching functionality of the voice packet switching system and a method for grouping traffic with the same voice compression encoding scheme.

By provisioning and/or configuring the network, a network operator may set up separate groups of AAL2 or VoIP connections on both the access links and the trunks, with each group provisioned for voice channels of a single profile. A profile is a scheme governing how voice can be carried over IP packets and ATM AAL2 cells. The profile defines what compression encoding is to be used, the format of the voice samples or frames, and how these samples or frames are to be encapsulated into the IP/RTP (Internet protocol/realtime transport protocol) packets or ATM AAL2 cells. A voice connection set-up request will carry a parameter specifying the choice of the profile. In setting up a voice connection path, the control software on each voice packet switch along the way will pick an appropriate matching outbound channel from the group with the same profile as that from the inbound channel. As a result, the entire path of the voice connection will use the same profile, or the same compression encoding. This provisioning concept is shown in FIG. 5.

Note that the proposed partitioning by profile does not require network topological changes, nor does it necessarily affect the routing of voice calls. The segregation or partitioning is on the logical connection level only. On a physical link joining two adjacent voice packet switches, for example, two or more AAL2/VoIP connections for different encoding can be provisioned prior to the acceptance of voice calls.

Because the DSP-less voice packet switch architecture leads to reduced footprint size and/or increased port density, costs associated with housing and heat dissipation for the switch is greatly reduced. The net benefits to the network operator are much lower capital outlay and ongoing operating costs in terms of real estate, power consumption, and air conditioning expenses. The greatly simplified hardware architecture also dramatically increases the intrinsic reliabilities of the overall switch system. Because the costs associated with DSP is significantly higher than the costs associated with packet processing and switching, the voice packet switch of the present invention achieves the best economy of scale at any given density.

The voice packet switch of the present invention achieves end-to-end voice switching regardless of the encoding, multiplexing, or transmission schemes used by the calling and called parties, and the inter-switch trunks along the voice connection's path. The voice packet switch is further operable with all voice encoding and compression schemes, physical layer transmission protocols, access protocols, and trunking protocols.

An important aspect of the present invention is the decoupling of the three key functions in switching voice over packet-switching networks: packet processing, digital signal processing (echo cancellation and voice compression), and switching. In doing so, the voice packet switch of the present invention allows each key function to be implemented in the most cost efficient manner for high density applications, such as in the central office. Furthermore, each function may be implemented with the most advanced state of the art technology independently from one another. Another benefit from eliminating DSP functionality from the voice packet switch is improved voice fidelity and echo cancellation quality. Further, significant end-to-end delays in voice transmission associated with jitter buffering are also eliminated.

The cost benefits provided by the present invention can be quantified or estimated. For a switch with N ports, there are N-port equivalent of interface circuits and $N^2$—port equivalent of switching cross points. The cost per port, which is of the most concern to a service provider, is the total cost divided by N. Therefore, the per port cost is the sum of the per port interface cost and the cost of N cross points. In the preferred embodiment of the present invention, the TDM switch fabric can be realized at very low costs because it is a scaling of simple and mature technology. The present invention first reduces the need for voice compression/decompression and echo canceling, and then offers another alternative where the digital signal processing interface components have been stripped down to only packet processing without the much more expensive voice compression and echo canceling circuits. By placing the quadratic complexity in the low cost TDM switch and the linear complexity in high cost components, the present invention achieves very good economics in scale to high port density.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A dual switching matrix fabric, comprising:
  a packet switch fabric configured to receive packet traffic from a plurality of packet transmission links, wherein the packet traffic includes multiplexed voice streams; and
  a TDM switch fabric configured to receive TDM traffic from a plurality of TDM transmission links;
  wherein the packet switch fabric and the TDM switch fabric collectively perform per-voice-channel switching between the packet and TDM transmission links and between different packet transmission links, wherein performing per-voice-channel switching between the different packet transmission links includes de-multiplexing the voice streams into individual voice channels, switching the individual voice channels individually according to a path of each voice conversation, and re-multiplexing individual voice channels sharing the same next hop onto the same outbound packet transmission link.

2. The dual switching matrix fabric of claim 1 wherein the TDM switch fabric is a time slot interchange.

3. The dual switching matrix fabric of claim 1 wherein at least one of the packet switch fabric and the TDM switch fabric performs DS0-level switching.

4. The dual switching matrix fabric of claim 1 wherein at least one of the packet switch fabric and the TDM switch fabric performs per-voice-channel-level switching.

5. The dual switching matrix fabric of claim 1 wherein the packet switch fabric and the TDM switch fabric collectively perform DS0-level switching of:
  data frames of the packet traffic received from the packet transmission links; and
  multiplexed PCM data of the TDM traffic received from the TDM transmission links.

6. The dual switching matrix fabric of claim 1 wherein the packet switch fabric switches variable length packets.

7. The dual switching matrix fabric of claim 1 wherein the plurality of packet transmission links includes a plurality of ATM cell transmission links and a plurality of VoIP packet transmission links, wherein the packet switch fabric receives ATM cell traffic from the ATM cell transmission links and VoIP packet traffic from the VoIP packet transmission links, and wherein the packet switch fabric and the TDM switch fabric collectively perform switching between the ATM cell transmission links, the VoIP packet transmission links, and the TDM traffic transmission links.

8. The dual switching matrix fabric of claim 1 wherein the packet switch fabric and the TDM switch fabric collectively comprise a switching system of:
  a PSTN network switching element; and
  a network gateway bridging a PSTN network and a packet-based network.

9. The dual switching matrix fabric of claim 8 wherein the switching system is deployed as the PSTN network switching element or the network gateway.

10. The dual switching matrix fabric of claim 1 further comprising means for interfacing between the packet switch fabric and the TDM switch fabric, including:
  means for converting packet traffic into generic-format traffic for switching by the TDM switch fabric; and
  means for converting generic-format traffic into packet traffic.

11. The dual switching matrix fabric of claim 10 wherein the generic-format traffic comprises frame-encapsulated packet data in which frame headers and trailers include control information.

12. The dual switching matrix fabric of claim 10 wherein the generic-format traffic substantially conforms to a standard high-level data link control (HDLC) protocol.

13. The dual switching matrix fabric of claim 12 wherein the standard HDLC protocol is a standard protocol for point-to-point communications and point-to-multipoint communications.

14. The dual switching matrix fabric of claim 12 wherein the standard HDLC protocol is selected from the group consisting of:
  frame relay protocol;
  link access procedure-balanced (LAP-B) protocol;
  link access procedure-data channel (LAP-DC) protocol;
  point-to-point protocol (PPP) protocol; and
  synchronous data link control (SDLC) protocol.

15. The dual switching matrix fabric of claim 12 wherein the standard HDLC protocol is configured for acceptance of variable-length voice mini-packets, a total bandwidth not greater than 64 Kbps, and error detection and recovery capabilities.

16. The dual switching matrix fabric of claim 1 further comprising at least one service module that performs interfacing between the packet switch fabric and the TDM switch fabric.

17. The dual switching matrix fabric of claim 16 wherein the at least one service module performs packet processing, including voice compression and echo cancellation.

18. The dual switching matrix fabric of claim 16 wherein the at least one service module is a plurality of service modules, including:
  a first service module that performs interfacing between the packet switch fabric and the TDM switch fabric for VoIP traffic;
  a second service module that performs interfacing between the packet switch fabric and the TDM switch fabric for AAL1 traffic; and
  a third service module that performs interfacing between the packet switch fabric and the TDM switch fabric for AAL2 traffic.

19. The dual switching matrix fabric of claim 1 further comprising a plurality of packet network interface controllers, wherein the packet switch fabric receives packet traffic from each of the packet transmission links via a corresponding one of the packet network interface controllers.

20. The dual switching matrix fabric of claim 1 further comprising a plurality of TDM network interface controllers, wherein the TDM switch fabric receives TDM traffic from each of the TDM transmission links via a corresponding one of the TDM network interface controllers.

\* \* \* \* \*

UNITED STATES PATENT AND TRADEMARK OFFICE
CERTIFICATE OF CORRECTION

PATENT NO. : 7,593,415 B2
APPLICATION NO. : 11/297941
DATED : September 22, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 484 days.

Signed and Sealed this

Twenty-first Day of September, 2010

David J. Kappos
*Director of the United States Patent and Trademark Office*